United States Patent
Amborn et al.

[11] Patent Number: 5,194,054
[45] Date of Patent: Mar. 16, 1993

[54] DIFFERENTIAL DRIVE

[75] Inventors: Peter Amborn, Neunkirchen-Seelscheid; Wolfgang Hildebrandt, Lohmar, both of Fed. Rep. of Germany

[73] Assignee: Viscodrive GmbH, Lohmar, Fed. Rep. of Germany

[21] Appl. No.: 690,536

[22] Filed: Apr. 23, 1991

[30] Foreign Application Priority Data

Apr. 25, 1990 [DE] Fed. Rep. of Germany ....... 4013202

[51] Int. Cl.⁵ ............................................. F16H 1/42
[52] U.S. Cl. .................................. 475/249; 475/252; 475/346; 475/347
[58] Field of Search ............... 475/226, 227, 248, 249, 475/252, 346, 347

[56] References Cited

U.S. PATENT DOCUMENTS

| | | | |
|---|---|---|---|
| 1,225,842 | 5/1917 | Mennie | 475/248 X |
| 2,462,000 | 2/1949 | Randall | 475/227 |
| 4,831,890 | 5/1989 | Valentin et al. | 475/249 X |
| 5,055,096 | 10/1991 | Riemschied et al. | 475/252 X |

FOREIGN PATENT DOCUMENTS

| | | | |
|---|---|---|---|
| 130806 | 1/1985 | European Pat. Off. | 475/226 |
| 356401 | 2/1990 | European Pat. Off. | 475/248 |
| 2206107 | 8/1972 | Fed. Rep. of Germany | |
| 2332997 | 1/1974 | Fed. Rep. of Germany | |
| 3911382 | 11/1989 | Fed. Rep. of Germany | |
| 2229502 | 9/1990 | United Kingdom | 475/249 |

*Primary Examiner*—Leslie A. Braun
*Assistant Examiner*—Benjamin Levi
*Attorney, Agent, or Firm*—Harness, Dickey & Pierce

[57] ABSTRACT

A differential gear system for use in the driveline of a motor vehicle, having a differential carrier (1) rotating in bearing of a differential housing (1) and driven via a driving gear tooth configuration; two axle shaft gears (10, 11) rotating in bearings of the differential carrier, which are coaxial relative to each other; and compensating gears (12, 13) eccentrically supported in, and rotating with, the differential carrier, where each of the compensating gears is in one part meshed with the one axle shaft gear (10) and in another part, with the other axle shaft gear (11), while engaging each other at least indirectly, and where the axle shaft gears (10, 11) have a tooth design which, when under torque, generates an axial thrust, and where friction-reducing means are provided at all face areas of at least the axle shaft gears (10, 11) that are subjected to loads during coasting of the motor vehicle, opposite the mating surfaces of the differential carrier (1) or the respective other axle shaft gear.

7 Claims, 2 Drawing Sheets

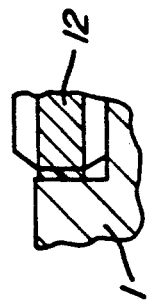
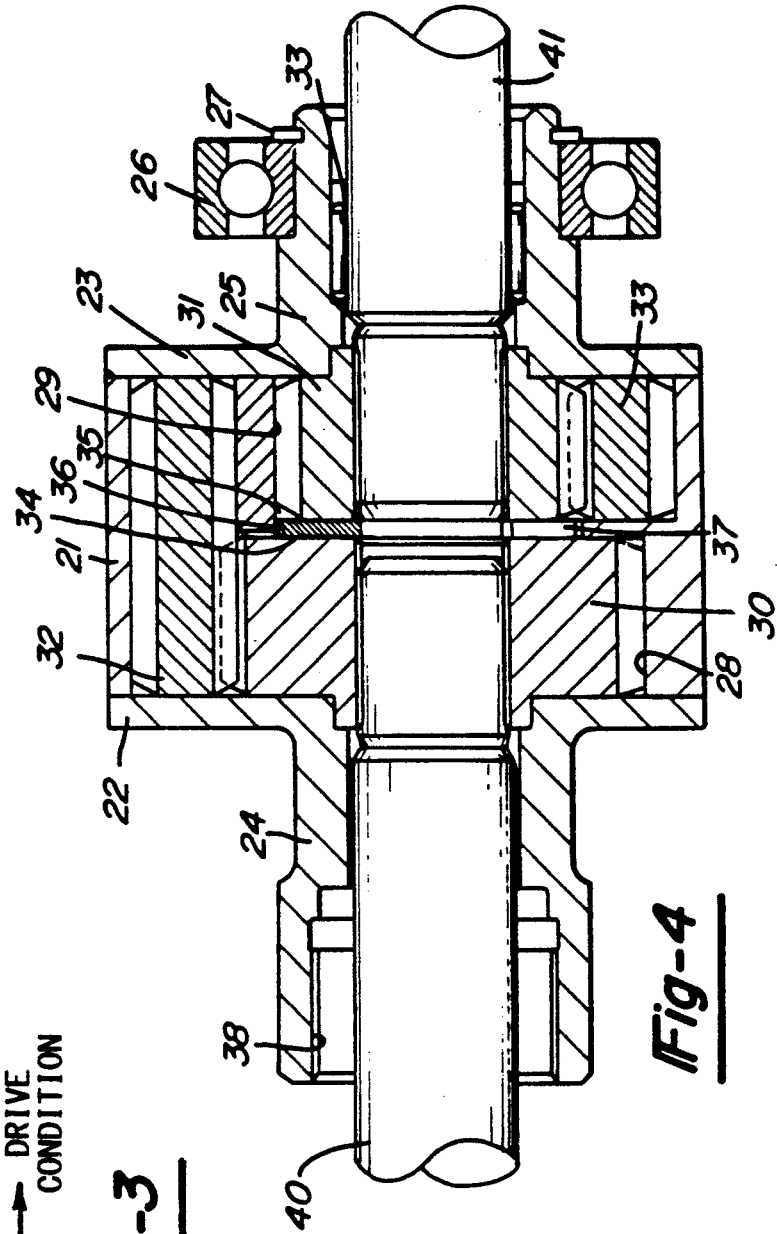
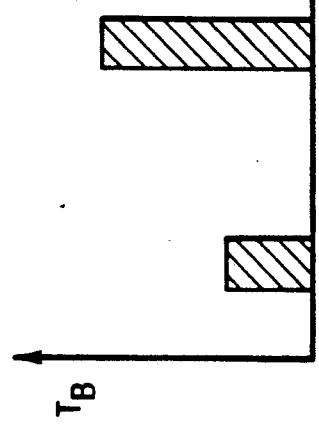

11,194,054

DIFFERENTIAL DRIVE

DESCRIPTION

This invention relates to a differential gear system for use in the driveline of a motor vehicle, comprising a differential carrier that rotates in bearings of a differential housing and is driven via a drive gear tooth configuration; two axle shaft gears rotating in bearings of the differential carrier, which are coaxial relative to each other; and compensating gears eccentrically supported in, and rotating with, the differential carrier, where each of the compensating gears in one part is meshed with the one axle shaft gear, and in another part with the other axle shaft gear, while engaging each other at least indirectly, and where the axle shaft gears have a tooth design which, when under torque, generates an axial thrust.

Such gear systems are known, for example, from GB 1 451 358 (Saari), or from WO 87/00900 (Russel). In addition to the self-locking effect resulting from the friction during tooth engagement, additional friction forces are effective that result from the contact between the axle shaft gears' face areas and their mating surfaces in the housing, possibly assisted by means of Belleville spring sets. In addition, friction forces are effective at the tooth tops of the compensating gears and on their face areas when the compensating gears slide pivotless on their tooth tops inside the cylindrical recesses. In the case of a previously described design of this type of differential where the compensating gears are asymmetrically distributed about the circumference, and where the output shaft gears are also supported by their tooth tops, additional friction forces are generated by a resulting radial component of the tooth forces exerted on the output shaft gears.

With prior-art gear systems, the major share of such friction forces is generated independent of the direction of power flow, i.e., under normal driving conditions and during coasting of the motor vehicle. In order to ensure compatibility for ABS systems in the motor vehicle, it is necessary to eliminate the self-locking effect during load reversals. For this purpose, several types of overrun systems and releasing mechanisms have been proposed previously.

It is the object of this invention to provide a differential gear system of the initially-mentioned type, featuring such overrun characteristics during load reversals while using simplified means.

The solution lies in the friction-reducing means provided on all friction surfaces subjected to loads during coasting of the motor vehicle, at least between the axle shaft gears and their cooperative mating surfaces. Said mating surfaces may be provided on intermediate sleeves between the axle shaft gears or, for designs with direct mutual load support, directly between the axle shaft gears. In a preferred design version, all surfaces subjected to axial loads must be of the friction-reducing type. In a manner simple by design and suitable for the loading conditions, the axle shaft gears are supported in a clear passage of the differential cage and, during load reversals, support each other toward the center of the differential gear system, either by direct contact or via an intermediate element. The tooth design of the axle shaft gears shall be such that, during load reversals, the axial forces effective at the axle shaft gears will be directed axially inward, toward the center of the differential gear system. Suitable friction-reducing means may be antifriction discs, friction-reducing surface coatings or thrust bearings.

For differential gear designs whose axle shaft gears are subjected to radial loads that cause friction at the tooth tops, friction-reducing cylindrical bushings or surface coatings have to be provided inside the differential cage, i.e., in the area of resulting radial forces during load reversals. This type of radial force differs in its angular direction from the resulting radial force effective during normal driving operations, in the area of which friction-increasing friction linings may be utilized. This applies only to the special design version that has compensation gears asymmetrically distributed about the circumference.

In the same manner as described here for axle shaft gears, similar means may be provided at the compensating gears' face areas, if subjected to axial forces, and at the circumferential surfaces inside the differential cage which are in frictional contact with the tooth tops and for which the loading conditions change during load reversals, as previously described for the axle shaft gears.

A preferred design version of the invention is represented by the drawings.

FIG. 3 illustrates in principle, the operational performance of the gear system.

FIG. 4 shows a longitudinal cross-section through the differential cage of a gear system illustrating another design of the invention above the central axis and an additional design of the invention below the central axis.

FIG. 5 is an enlarged exaggerated view of the abutment of a compensating gear with the cage.

Figure 1:
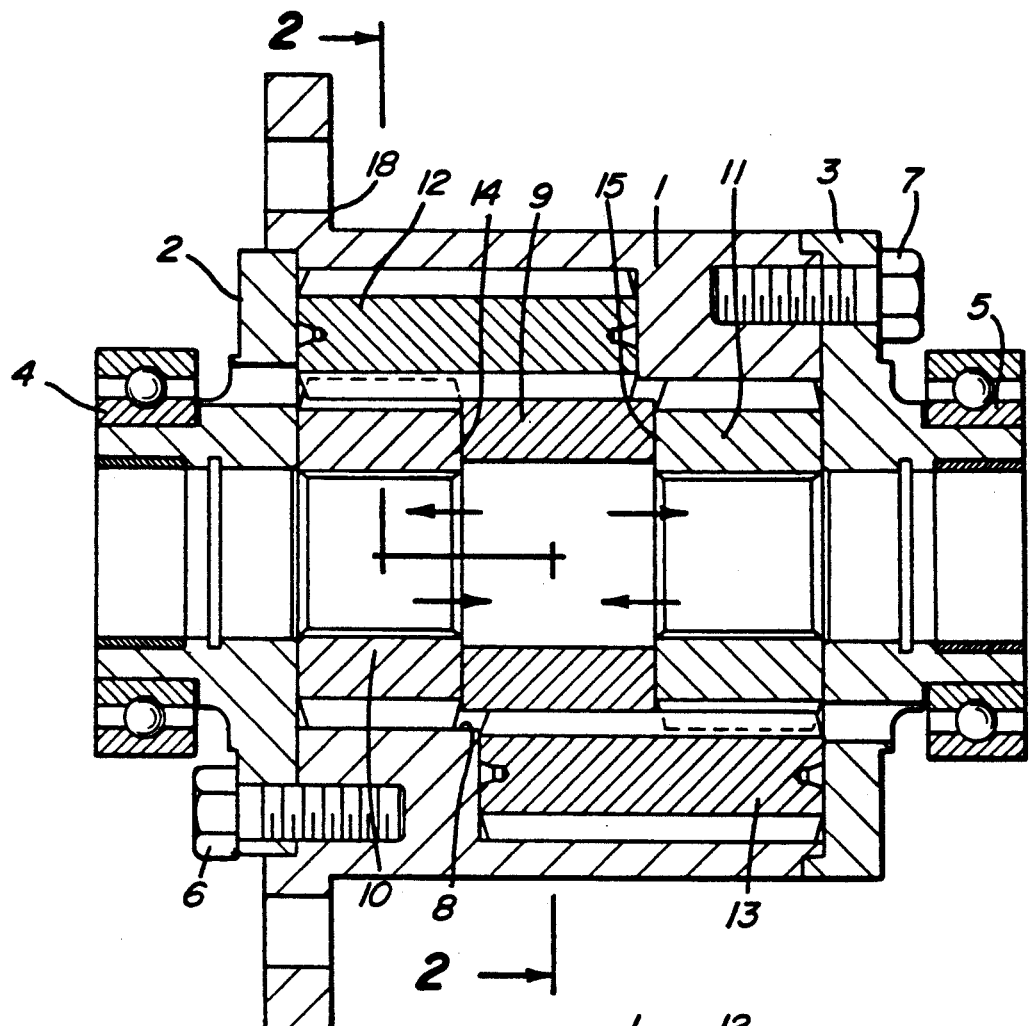
FIG. 1 is a longitudinal section through a differential cage of a gear system in accordance with this invention.
Figure 2:
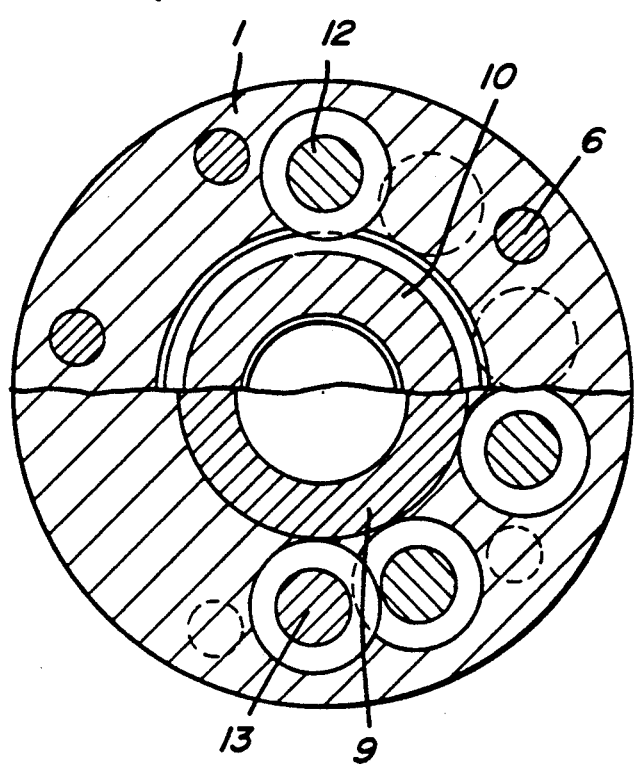
FIG. 2 is a cross-section through a differential cage of a gear system in accordance with this invention as per FIG. 1.

FIGS. 1 and 2 show a differential cage comprising a central cage portion 1 and two attached covers 2, 3, with the differential cage requiring support bearings for rotation in a differential housing (not illustrated). Projections 4, 5 on the housing covers 2, 3 serve as receptacles for the roller bearings (not illustrated). Bolts 6, 7 connect the central differential cage portion with the covers 2, 3. A gear with driving tooth configuration must be attached to the flange 18. A cylindrical through-bore 8 in the central cage portion 1, supports the axle shaft gears 10, 11 which slide directly on their tooth tops. Between these two items, an intermediate bushing 9 is inserted in the cylindrical bore 8. As an example, this bushing may be of a floating design. The axle shaft gear 10 is in mesh with the first set of compensating gears 12, of which several are distributed about the circumference; compensating gears 13 of the same type but axially offset, are in mesh with the axle shaft gear 11. Each of the compensating gears 12 is meshed with one of the compensating gears 13, which as a whole are alternatingly distributed about the circumference in an asymmetrical pattern, by groups of two. The axle shaft gears 10, 11 and the compensating gears 12, 13 are of a helical tooth design arranged in such a way that under normal operating conditions (traction), each of the axial forces applied to the axle shaft gears 10, 11 is directed outward so that friction between the axle shaft gears 10, 11 and the respective inner faces of the covers 2, 3 is increased (high friction). In the case of load reversal (braking), each of the axial forces applied to the axle shaft gears 10, 11 is directed axially inward. At that point, friction-reducing coatings 14, 15 are provided on the axle shaft gears 10, 11 and/or the bushing 9 in such a way that friction between the corresponding surfaces is reduced during load reversal (low friction). The antifriction plates may also be substituted by thrust bearings. The external face areas of the axle shaft gears 10, 11 may also be covered with friction-increasing coatings. Also, the compensating gears may be provided with a friction reducing coating or plate opposite the mating surfaces of the differential cage 1, as seen in FIG. 5.

FIG. 3 shows that, due to the means applied, during load reversal the locking effect (TB) is minimal (braking first second), while under normal operating conditions the locking effect (TB) is high (traction).

FIG. 4 shows a differential cage comprised of one central cage portion 21, and two attached covers 22, 23, where the differential cage requires support bearings for rotation inside a differential housing (not shown). Projections 24, 25 of the housing covers 22, 23 provide the pilot bores for roller bearings, of which one roller bearing 26 is shown, secured with a washer 27. An internal drive gear tooth configuration is provided inside projection 24. The cylindrical bores 28, 29 in the central cage portion 21 support the axle shaft gears 30, 31 for sliding rotation directly on their tooth tops. These gears have stub shafts 40, 41 inserted of which the latter is supported inside of projection 25, via a roller bearing 39. An interface plate 36 (shown in upper half of figure) or a thrust bearing 37 (shown in lower half of figure) is inserted in the cylindrical bore 29 between the axle shaft gears 30, 31. An example, this may be of a floating design. The axle shaft gear 30 is in mesh with the first set of compensating gears 32, of which several are arranged circumferentially; compensating gears 33 located on a smaller reference diameter, are in mesh with axle shaft gear 31. Each of the compensating gears 32 is in mesh with at least one of the compensating gears 33. The axle shaft gears 30, 31, and the compensating gears 32, 33 are designed with a helical tooth configuration arranged in such a way that during normal operation (traction) each of the axial forces applied to the axle shaft gears 30, 31 is directed outward, resulting in an increase of friction between the axle shaft gears 30, 31 and the corresponding inner surfaces of the covers 22, 23 (high friction). During load reversal (braking), the axial forces are applied to the axle shaft gears 30, 31, each axially inward. At that point, there are either friction-reducing coatings 34, 35 provided on the axle shaft gears 30, 31 and/or on the plate 36, or a thrust bearing 37, for a decrease in friction between the corresponding surfaces during load reversal (low friction).

The external surfaces of the axle shaft gears 30, 31 may be equipped with friction-increasing coatings.

We claim:

1. A differential gear system for use in the driveline of a motor vehicle, comprising a differential carrier that rotates in bearings of a differential housing and is driven via a drive gear tooth configuration; two axle shaft gears rotate in the differential carrier and are coaxial relative to each other; and at least two compensating gears are eccentrically supported in, and rotating with, the differential carrier, one of the compensating gears is meshed with one of said axle shaft gears, and the other compensating gear of the compensating gears is meshed with the other axle shaft gear, while engaging each other at least indirectly, and where the axle shaft gears have a tooth design which, when under torque, generates an axial thrust, said axle shaft gears being supported inside a clear passage of the differential carrier; surfaces of the axle shaft gears which are subjected to loads with transmission of torque from the wheels to the driveline are arranged toward the center of the differential cage; and the axle shaft gears surfaces and/or surfaces in contact with said axle shaft gears which are subjected to loads with transmission of torque from the wheels to the driveline are provided with passive free floating first friction-reducing means positioned between said axle shaft gears and said surfaces in contact with said axle shaft gears, while the axle shaft gears are mutually supportive, either directly, or by means of intermediate elements.

2. A differential gear system according to claim 1, wherein the surfaces of the compensating gears and/or surfaces in contact with differential cage which are subjected to loads with transmission of torque from the wheels to the driveline are provided with passive free floating second friction-reducing means.

3. A differential gear system according to claim 1, wherein the first friction-reducing means is provided on face areas of the axle shaft gears.

4. A differential gear system according to claim 1, wherein the first friction-reducing means is provided in the form of antifriction plates.

5. A differential gear system according to claim 1, wherein the second friction-reducing means is provided on face areas of the compensating gears.

6. A differential gear system according to claim 2, wherein the second floating friction-reducing means is in the form of antifriction plates.

7. A differential gear system according to claim 3, wherein the first floating friction-reducing means is in the form of antifriction plates.

* * * * *

UNITED STATES PATENT AND TRADEMARK OFFICE
CERTIFICATE OF CORRECTION

PATENT NO. : 5,194,054

DATED : March 16, 1993

INVENTOR(S) : Peter Amborn

It is certified that error appears in the above-identified patent and that said Letters Patent is hereby corrected as shown below:

Abstract, line 3, "bearing" should be --bearings--.

Column 3, line 35, "An example" should be --As an example--.

Column 4, line 45, claim 5, "1" should be --2--.

Signed and Sealed this

Seventh Day of December, 1993

*Attest:*

BRUCE LEHMAN

*Attesting Officer*   *Commissioner of Patents and Trademarks*